Feb. 25, 1964 H. C. WARREN 3,122,131
ANTI-ROOSTING DEVICE FOR POULTRY FEED AND WATER TROUGHS
Filed March 26, 1962 4 Sheets-Sheet 1
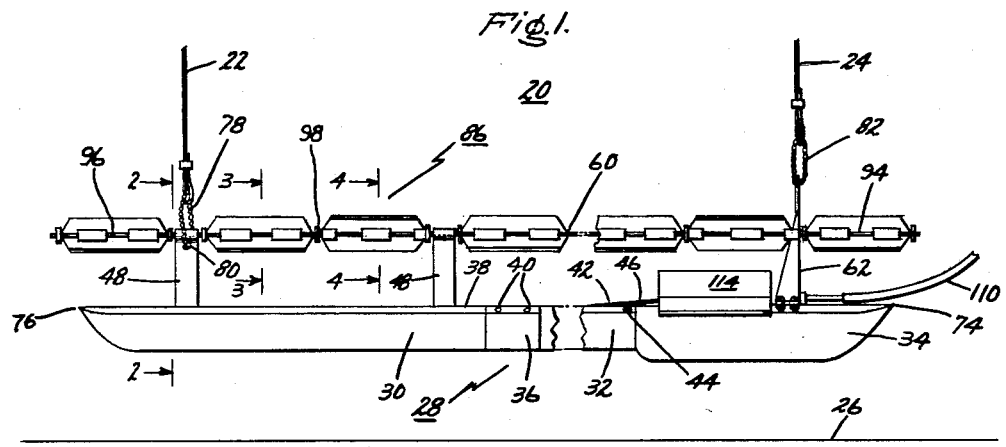
Inventor:
Howard C. Warren,
by Hood, Gust & Irish
Attorneys.

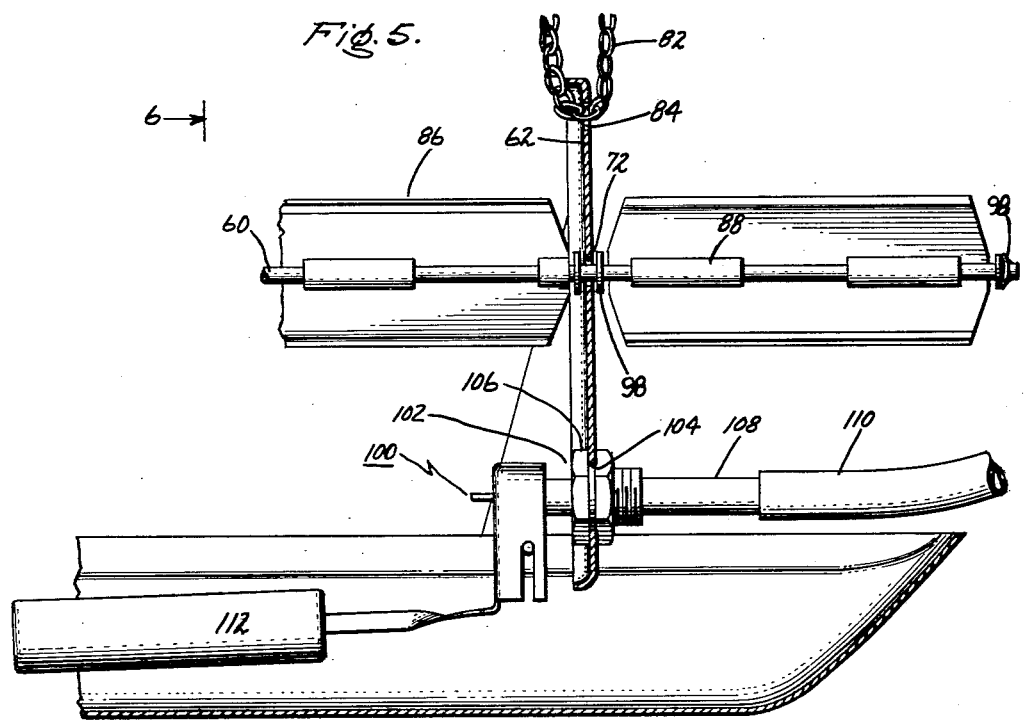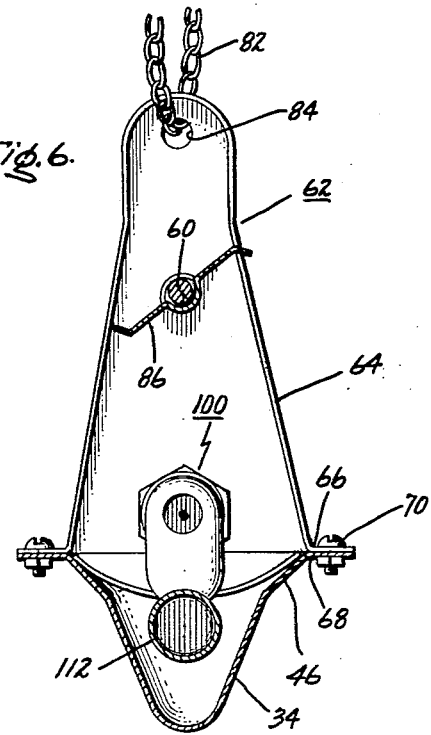

Feb. 25, 1964   H. C. WARREN   3,122,131
ANTI-ROOSTING DEVICE FOR POULTRY FEED AND WATER TROUGHS
Filed March 26, 1962   4 Sheets-Sheet 3
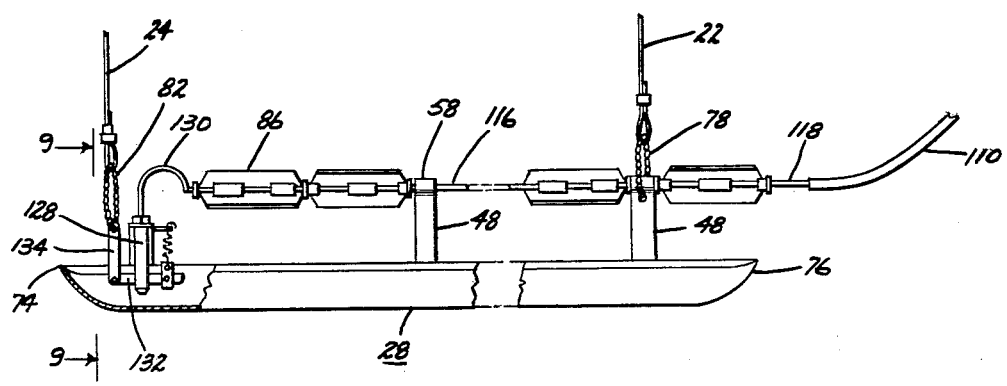
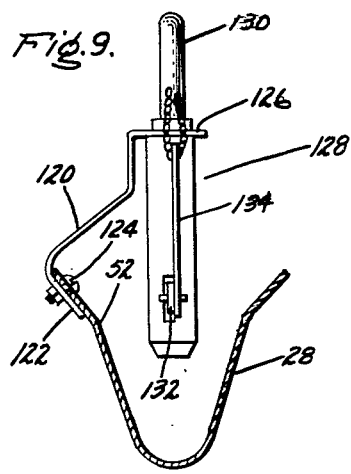
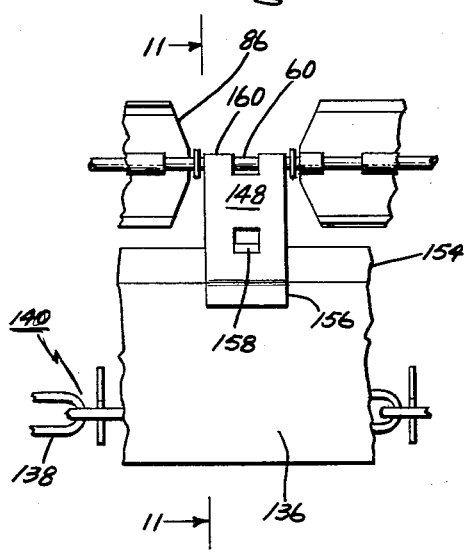
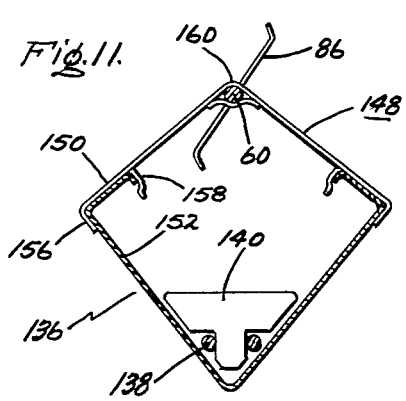
Inventor:
Howard C. Warren,
by Hood, Gust & Irish
Attorneys.

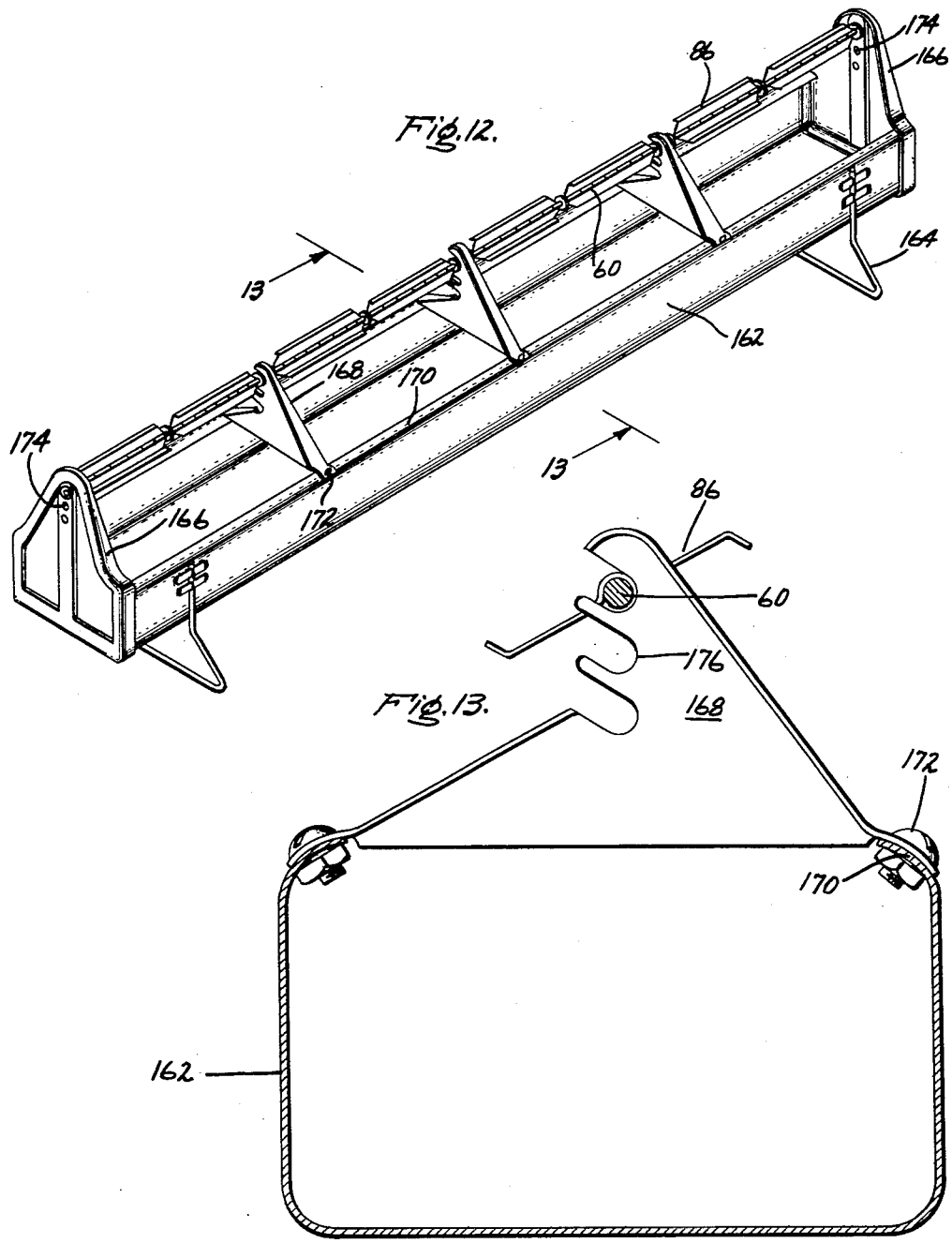

United States Patent Office 3,122,131
Patented Feb. 25, 1964

3,122,131
ANTI-ROOSTING DEVICE FOR POULTRY FEED
AND WATER TROUGHS
Howard C. Warren, North Manchester, Ind., assignor to
The Warner Brooder Corporation, North Manchester,
Ind.
Filed Mar. 26, 1962, Ser. No. 182,330
15 Claims. (Cl. 119—72)

This invention relates generally to apparatus for poultry husbandry such as poultry watering and feeding devices, and more particularly to apparatus for preventing poultry from roosting on such apparatus.

Poultry tend to roost or perch on any available surface, and thus, unless prevented, will roost on watering and feeding devices thus contaminating the water or feed. In the quantity production of poultry, such as chickens and turkeys, automatic watering and feeding devices have been developed, both of which conventionally comprise an elongated trough element with valve means for automatically admitting water to the trough in the case of watering devices, and endless chain means for distributing feed along the trough in the case of feeding devices; such elongated watering and feeding devices afford an ideal perch for poultry. Further, it is common practice to suspend poultry watering devices from the ceiling of the building so that their height can be readily adjusted as the birds grow, and further so that they can be lifted completely out of the way for cleaning the floor. In the case of such suspended watering devices, perching of the poultry on the trough results in its being tilted thus spilling water onto the floor.

In the past, wire grills have been employed on watering and feeding devices in an effort to prevent the birds from perching thereon, however, such wire grills have not been completely successful in preventing the birds from roosting and further, it has been necessary that they be removed in order to permit cleaning the trough. Elongated reels rotatably mounted over the trough have also been employed, such reels conventionally carrying a fixed axis at each end which in turn is rotatably journaled in a suitable support at each end of the reel. To the best of the present applicant's knowledge, such prior reel arrangements in which each reel element conventionally extended either the full length or one-half the length of the trough have not been satisfactory since several adult birds have been able to balance themselves on the elongated reel elements and their combined weight has been sufficient to bend the reel element so that it will no longer rotate, thus providing the birds with an ideal roosting spot.

It is thus highly desirable to provide apparatus for preventing poultry from roosting on a watering or feeding trough which is foolproof, permits ready cleaning of the trough, and is further characterized by its simplicity and ease of manufacture in quantity production.

It is accordingly an object of my invention to provide improved apparatus for preventing poultry from roosting on a trough.

Further objects and advantages of my invention will become apparent by reference to the following description and the accompanying drawing, and the features of novelty which characterize my invention will be pointed out with particularity in the claims annexed to and forming a part of this specification.

The objects of my invention are attained by providing a plurality of axially relative short reel members, each such reel member being independently rotatably mounted on an elongated bearing member. More particularly, in accordance with my invention there is provided an elongated trough with a plurality of bracket members respectively secured to the trough at spaced intervals therealong and extending upwardly above the trough. An elongated bearing means is provided supported by the bracket members spaced above the trough and parallel therewith, and a plurality of axially relatively short reel members are provided respectively independently rotatably mounted on the bearing means.

In the drawing, FIG. 1 is a side elevational view of one embodiment of automatic poultry watering apparatus incorporating my invention;

FIG. 2 is a cross-sectional view taken along the line 2—2 of FIG. 1;

FIG. 3 is a cross-sectional view of one reel element taken along the line 3—3 of FIG. 1;

FIG. 4 is a cross-sectional view of an adjacent reel element taken along the line 4—4 of FIG. 1;

FIG. 5 is an enlarged side cross-sectional view of one end of the embodiment of FIG. 1 showing the mounting of the float valve thereon;

FIG. 6 is a cross-sectional view taken along the line 6—6 of FIG. 5;

FIG. 7 is a cross-sectional view taken along the line 7—7 of FIG. 2;

FIG. 8 is a side view, partly in cross-section, showing another embodiment of automatic poultry watering apparatus incorporating my invention;

FIG. 9 is a cross-sectional view taken along the line 9—9 of FIG. 8;

FIG. 10 is a fragmentary side view of automatic poultry feeding apparatus incorporating another embodiment of my invention;

FIG. 11 is a cross-sectional view taken along the line 11—11 of FIG. 10;

FIG. 12 is a view in perspective showing a floor-type poultry feeder incorporating yet another embodiment of my invention; and FIG. 13 is a cross-sectional view taken along the line 13—13 of FIG. 12.

Referring now to FIGS. 1 through 7 of the drawing, there is shown automatic poultry watering apparatus, generally indicated at 20, of the type which is suspended by means of cables 22 and 24 from an overhead support (not shown) at a selectively adjustable height above the floor or ground level 26.

The apparatus 20 comprises an elongated trough 28 formed of a first end section 30, any desired number of intermediate sections 32 and a second end section 34. End section 30 and intermediate section 32 are secured together by plate members 36 bolted to flanges 38, as at 40, it being understood that any desired number of intermediate sections 32 may be secured together in abutting relationship in similar fashion. End section 34 has a forward portion 42 nested within the adjacent intermediate section 32 and secured thereto by means of bolts 44 extending through the flange 38 of the intermediate section and flange 46 of the end section 34. The sections which are employed to make up the trough 28 in any desired length are formed of suitable relatively thin sheet metal which may be galvanized or enameled, it being understood that the trough 28 per se and the method of fabricating it into any desired length does not form a part of my invention, being shown for illustrative purposes only.

A plurality of bracket members 48 are provided formed of suitable sheet metal and having their lower ends 50 respectively secured to one side wall 52 of trough sections 30, 32 at axially spaced-apart intervals in any suitable manner, as by screws 54. Brackets 48 have flanges 56 respectively formed on their side edges for strength and extend upwardly with rolled support elements 58 being respectively formed at their upper ends and disposed in vertical alignment with the axial center line of the trough sections 30, 32. An elongated rod element 60 is journaled in the support elements 58 and is thus supported in spaced-apart vertical alignment with the axial center line of the trough sections 30, 32 and parallel therewith.

Another bracket member 62 is provided formed of suitable sheet metal disposed transversely of trough section 34 and extending vertically upwardly therefrom. Bracket 62 has flanges 64 formed on its side edges for strength which are respectively joined to bottom flanges 66, which in turn are respectively secured to side flanges 68 of end section 34 of trough 28 by means of screws 70. Bracket member 62 has an opening 72 formed therein which rotatably supports rod element 60 as shown. It will be readily seen that bracket member 62 is spaced axially inwardly from end 74 of end-section 34 and that the end bracket member 48 is likewise axially spaced inwardly from end 76 of trough section 30.

In the illustrated embodiment, trough 28 is suspended by means of cable 22 engaging a suitable chain loop 78 which passes through an opening 80 in the end bracket 48, and cable 24 which engages a suitable chain loop 82 which in turn passes through a suitable opening 84 in bracket 62. It will be readily understood that additional cables and chain loops may be provided engaging additional bracket members 48 depending upon the overall length and weight of the assembly.

In order to prevent roosting of birds on the assembly thus far described, there are provided a plurality of reel members 86 respectively independently rotatably mounted on the rod element 60. Each of the reel elements 86 is formed of relatively thin sheet metal and is rotatably supported along its axial center line on the rod element 60 by means of pierced and formed bearing elements 88. Each of the reel elements 86 further is provided with oppositely extending flanges 90 and 92 respectively formed along its side edges, as shown. There are preferably at least two reel elements 86 between each pair of bracket members 48, and between the end bracket member 62 and the adjacent bracket member 48 and further, for a reason to be hereinafter more fully described, the adjacent reel members 86 between each pair of bracket members preferably are respectively reversed so that their corresponding flanges 90 and 92 extend in opposite directions, as best seen in FIGS. 3 and 4.

The rod element 60 has end portions 94 and 96 respectively extending axially outwardly beyond the end bracket members 62 and 48 over the respective extremities of trough 28 with a single reel member 86 being respectively rotatably mounted on each of the extension portions 94 and 96. The reel elements 86 are respectively spaced-apart from each other and from the brackets 48, 62 by means of suitable washers 98 on the rod element 60 and the reel members 86 are held in assembled relation on the bracket members 48, 62 by means of suitable lock washers 98, as best seen in FIG. 5.

In order to supply water to the trough 28 and automatically to control the water level therein, a conventional float valve 100 is provided having a valve body 102 which extends through an opening 104 in bracket member 62 and is secured thereto by means of suitable threaded fasteners 106, as shown in FIG. 5. An inlet pipe 108 is connected to a valve body 102 to which in turn is connected a flexible hose 110 adapted to be connected to a suitable source of water supply (not shown). A conventional float element 112 is connected to valve body 102 and is disposed within the enlarged end section 34 of trough 28 so as to activate the valve 100 in response to the water level therein, as is well known to those skilled in the art. A suitable sheet metal cover 114 may be provided snapped over the flanges 68 of the end section 34 of trough 28 so as to protect the float element 112 of the float valve 100.

It will be observed that the reel members 86 are relatively axially short compared with the overall length of trough 28 and that each reel member is individually rotatable upon the rod element 60. The length of the reel elements 86 is preferably proportioned to be on the order of one and one-half times the width of an adult bird of the breed with which the apparatus is intended to be used and for the raising of conventional breeds of chickens, for example, Plymouth Rocks, I have found that the axial length of the reel members 86 should be between approximately four inches and approximately eight inches. Selection of the transverse width of the reel members 86 is also important and I have found in the case of conventional breeds of chickens, that if the width is over two inches, the adult bird with the pad of his foot resting on the flat surface of the reel member can hook his toe under one or the other of the flanges 90, 92, and thus occasionally strike a balance, and if the width is under one inch, the bird is able to grasp the entire blade and again on occasion strike a balance. I have thus found that the optimum width in the case of conventional breeds of chickens is from one inch to two inches. It will be readily apparent that the above set forth optimum dimensions can be varied for different sized breeds of poultry, such as, for example, turkeys.

With the provision of the axially relatively short reel members 86, while occasionally it may be possible for one bird to strike a balance on one reel member, the entire system is so unstable that one other bird attempting to perch on the same reel member or anywhere on the assembly will invariably result in both birds falling off. Further, if one bird does succeed in perching upon an individual reel member 86, if he attempts to walk axially along the assembly, the instability of the system immediately results in his falling off, particularly by virtue of the alternate reversal of the reel members between each pair of supporting bracket members.

The above described arrangement for preventing the perching of poultry upon a trough can be provided on troughs of any length, i.e., as short as four feet and as long as 80 feet. It has been found that with this apparatus, perching of birds upon the apparatus has been substantially completely eliminated, it having been observed that at no time has more than one bird been able to perch on the apparatus and that for only an extremely short period of time. The apparatus in no way interferes with the birds drinking from the trough, nor does it interfere with cleaning of the trough since a conventional mop or brush can be run down the length of the trough for cleaning without the requirement for removing or disassembling any element of the apparatus While the apparatus of FIGS. 1 through 7, inclusive, has been shown as embodied in a suspended type of watering device which can be raised or lowered by means of a winch to permit adjustment of the height of the device as the birds grow and also to permit its being raised completely out of the way for cleaning the building, it will be readily apparent that the apparatus is equally usable in connection with a device which is supported on the floor or ground. It will be readily seen that the components of the apparatus, i.e., the brackets 48, 62 and the reel members 86 are economically produced in conventional punch press operations and it will be further observed that the end bracket 62 not only provides support for the rod element 60 and a means for suspending the assembly, but also provides a support for the float valve 100. It will be readily understood that, in the case of long troughs, the rod element 60 may be formed in shorter sections which may be joined together by suitable removable coupling devices, or in the alternative the adjacent ends of shorter rod sections 60 may merely be accommodated and supported in the support element 58 of one of the bracket members 48.

Referring now to FIGS. 8 and 9 in which like elements are indicated by like reference numerals, another embodiment of the invention is shown incorporating a weight-actuated valve, of the type referred to as a "Fox" valve. Here, trough 28 is again provided formed of suitable relatively thin sheet metal and in the desired number of sections to provide the requisite length. Since a float valve is not employed in this embodiment, the enlarged end section 34 of the previous embodiment is not required. Here, again, a plurality of axially spaced-apart upstanding bracket members 48 are provided secured to one side wall of the trough 28, however, in this case the rolled support elements 58 support an elongated tube 116. It will be seen that the end bracket member 48 is axially spaced from end 76 of the trough 28 and that tube 116 has a portion 118 extending outwardly therefrom over end 76 of trough 28 with flexible hose 110 secured thereto and adapted to be connected to a suitable source of water supply (not shown). Another bracket 120 is provided having its lower end 122 secured to side wall 52 of trough 28 by means of screw 124. The upper end 126 of bracket 120 supports the valve 128 so that it extends downwardly into the trough 28 to inject water therein. The other end 130 of tube 116 is connected to valve 128 for supplying water thereto.

In this embodiment, the reel members 86 are individually rotatably mounted on the tube 116 which thus, insofar as the reel members are concerned, serves the same function as the rod element 60 of the previous embodiment.

The valve 128 is provided with an actuating lever 132 to which a link 134 is connected which in turn is suspended by chain loop 82 and cable 24. Thus, it will be readily seen that as the height and thus weight of the water in the trough 28 increases, the downward force exerted thereby will cause cable 24, chain loop 82, and link 134 to actuate valve 128 thus to shut off the supply of water. Conversely, as the height of the water in trough 28, and thus its weight, is decreased, the downward force is decreased thus permitting the valve to be actuated to introduce additional water into the trough.

It will be readily seen that the apparatus for preventing roosting of poultry on an elongated trough can be equally advantageously employed in connection with automatic poultry feeding apparatus and the assembly comprising brackets 48, rod element 60 and reel members 86 can be attached to the side of an automatic feeding trough as well as on the side of an automatic watering trough.

Referring now to FIGS. 10 and 11, there is shown a further embodiment of the invention particularly suited for automatic poultry feeding apparatus and adapted to be removably assembled thereon. Here, an elongated sheet metal trough 136 is provided having therein an endless chain 138 which carries suitable flights 140 thereon at spaced intervals for carrying feed along the trough; the trough 136, chain 138 and flights 140 form a part of a conventional commercially available automatic poultry feeding apparatus which does not form a part of my invention being shown for illustrative purposes only.

A plurality of generally V-shaped bracket members 148 are provided respectively having ends 150 removably snapped onto the side walls of trough 136. In the illustrated embodiment, the side walls 152 of trough 136 are respectively provided with inwardly turned flanges 154. Flanges 154 are in turn respectively engaged by flanges 156 on ends 150 of the bracket members 148 and by pierced resilient tabs 158, as shown.

Pierced and formed support portions 160 are formed in bracket members 148 intermediate their ends 150 and, as in the case of a previous embodiment, support rod element 60 vertically spaced above the axial center line of trough 136 and parallel therewith. Reel members 86 are individually rotatably mounted upon the rod element 60.

Referring now to FIGS. 12 and 13, in which like elements are still indicated by like reference numerals, there is shown a conventional floor-type, hand-filled feeder incorporating my invention. Here, trough 162 is formed of suitable relatively thin sheet metal and is supported on the floor or ground by conventional formed wire legs 164. Trough 162 has end members 166 respectively secured to its ends and extending upwardly, as shown.

A plurality of bracket members 168 are provided formed of relatively thin sheet metal respectively extending transversely across trough 162 at axially spaced intervals and secured to flanges 170 in any suitable manner, as by threaded fasteners 172.

Rod elements 60 extends axially between and is supported by end members 166 at a selectively adjustable height above and parallel with trough 162, the ends of rod element 60 being respectively selectively inserted in a corresponding pair of openings 174 in end members 166. Rod element 60 is supported intermediate its ends by bracket members 168, being seated in corresponding notches 176, as shown. A pair of reel members 86 are again independently rotatably mounted on rod element 60 between each pair of bracket members 168 and between end members 166 and the adjacent bracket members 168.

It will now be seen that I have provided apparatus for preventing roosting of poultry on elongated troughs, the apparatus being readily installed on automatic watering and feeding troughs and on conventional hand-filled troughs, and further being characterized by its simplicity and effectiveness.

While I have shown in the several embodiments the provision of two reel members between each pair of bracket members, and while I believe the device is most effective when at least two reel members are employed in side-by-side adjacent relationship, it will be understood that a single reel member may be provided between a pair of bracket members. Further, while the reversal or alternating of adjacent reel members so that their corresponding flanges extend in opposite directions is preferable, the device is nevertheless effective when adjacent reel members are not reversed.

While I have illustrated and described specific embodiments of my invention, further modifications and improvements will occur to those skilled in the art, and I desire therefore in the appended claims to cover all modifications which do not depart from the spirit and scope of my invention.

What is claimed is:

1. Apparatus for poultry husbandry comprising: an elongated trough; a plurality of bracket members respectively secured to said trough at spaced intervals therealong and extending upwardly above said trough; elongated bearing means supported by said bracket members spaced above said trough and parallel therewith; and a plurality of axially relatively short reel members respectively mounted on said bearing means for freely balanced independent rotation thereon, said reel members respectively having smooth side edges and cooperating to provide an unstable system thereby to prevent perching of poultry on said trough each of said reel members having a length less than twice the normal width of the poultry attempting to roost thereon.

2. The apparatus of claim 1 wherein there are at least two of said reel members intermediate each adjacent pair of bracket members.

3. The apparatus of claim 1 wherein there are at least two of said reel members intermediate each adjacent pair of bracket members, each of said reel members being formed of relatively thin metal and being mounted along its axial center line on said bearing means, each of said reel members having oppositely extending flanges formed on its side edges, adjacent reel members between each said pair of bracket members having corresponding flanges respectively extending in opposite directions.

4. The apparatus of claim 1 wherein there are two of said bracket members respectively spaced from the ends of said trough, said bearing means having end portions respectively extending outwardly beyond said two bracket members, each of said end portions having a reel member thereon.

5. The apparatus of claim 1 wherein said trough is a watering trough, and further comprising valve means mounted on one of said bracket members and adapted to be connected to a source of water supply for admitting water to said trough and controlling the water level therein.

6. The apparatus of claim 1 wherein said trough is a watering trough, and further comprising a float valve mounted on one of said bracket members and adapted to be connected to a source of water supply for admitting water to said trough and controlling the water level therein.

7. The apparatus of claim 1 wherein said trough is a watering trough and said bearing means is an elongated tube adapted to have one end connected to a source of water supply, and further comprising a valve connected to the other end of said tube for admitting water to said trough, said valve having means for controlling the level of water in said trough.

8. Poultry watering apparatus comprising: an elongated trough; a plurality of bracket members respectively having one end secured to one side of said trough at spaced intervals therealong and extending upwardly above said trough; an elongated rod element supported by the other end of said bracket members spaced above the center of said trough and parallel therewith; another bracket member extending across said trough and secured to both sides thereof, said other bracket member extending upwardly from said trough and supporting said rod element, said other bracket member being spaced from one end of said trough and from the adjacent bracket member; the one of said plurality of bracket members adjacent the other end of said trough being spaced therefrom; said rod element having end portions extending respectively outwardly beyond said one bracket member and said other bracket member; a plurality of axially relatively short reel members respectively mounted on said rod element for freely balanced independent rotation thereon, there being at least two of said reel members intermediate each adjacent pair of bracket members and one reel member on each end portion of said rod element, each of said reel members being formed of relatively thin metal and being mounted along its axial center line on said rod element, each of said reel members having oppositely extending flanges formed on its side edges, said reel members cooperating to provide an unstable system thereby to prevent perching of poultry on said trough, each of said reel members having a length less than twice the normal width of the poultry attempting to roost thereon; and a float valve including a valve body and a float element, said valve body being mounted on said other bracket member with said float element disposed in said trough, said valve body having inlet means adapted to be connected to a water source.

9. The apparatus of claim 8 wherein at least said one and other bracket members have means thereon for suspending said apparatus.

10. Poultry watering apparatus comprising: an elongated trough; a plurality of bracket members respectively having one end secured to one side of said trough at spaced intervals therealong and extending upwardly above said trough; an elongated tube supported by the other ends of said bracket members spaced above the center of said trough and parallel therewith; another bracket member having one end secured to one side of said trough and extending upwardly therefrom, said other bracket member being spaced from one end of said trough and from the adjacent bracket; the one of said plurality of brackets adjacent the other end of said trough being spaced therefrom; said tube having one end portion extending respectively outwardly beyond said one bracket member and adapted to be connected to a source of water; a valve mounted on said other bracket member and having an actuating lever for controlling the flow therein; said tube having its other end portion connected to said valve; a plurality of axially relatively short reel members respectively mounted on said tube for freely balanced independent rotation thereon, there being at least two of said reel members intermediate each adjacent pair of said plurality of bracket members and one reel member on said one end portion of said tube, each of said reel members being formed of relatively thin metal and being mounted along its axial center line on said tube, each of said reel members having oppositely extending flanges formed on its side edges, said reel members cooperating to provide an unstable system thereby to prevent perching of poultry on said trough, each of said reel members having a length less than twice the normal width of the poultry attempting to roost thereon; said one bracket member having means thereon for suspending said assembly; and means connected to said lever member for suspending said assembly thereby to actuate said valve in response to the weight of water in said trough.

11. Apparatus for use in preventing poultry from roosting on an elongated trough comprising: a plurality of bracket members respectively having means for securing the same to a trough; an elongated bearing element supported at spaced intervals by said bracket members; and a plurality of axially relatively short reel members respectively mounted on said bearing element for freely balanced independent rotation thereon, said reel members respectively having smooth side edges and cooperating to provide an unstable system thereby to prevent perching of poultry on said trough, each of said reel members having a length less than twice the normal width of the poultry attempting to roost thereon.

12. The apparatus of claim 11 wherein there are at least two of said reel members intermediate each adjacent pair of said bracket members.

13. The apparatus of claim 11 wherein there are at least two of said reel members intermediate each adjacent pair of said bracket members, each of said reel members being formed of relatively thin metal and being mounted along its axial center line on said bearing element, each of said reel members having oppositely extending flanges formed in its side edges, adjacent reel members between each said pair of bracket members having corresopnding flanges respectively extending in opposite directions.

14. Apparatus for use in preventing poultry from roosting on an elongated trough comprising: a plurality of bracket members each having two ends, each of said ends having means thereon for securing the same to a respective side of a trough; an elongated bearing element; each of said bracket members having means intermediate its ends supporting said bearing element; and a plurality of axially relatively short reel members respectively mounted on said bearing element for freely balanced independent rotation thereon, said reel members respectively having smooth side edges and cooperating to provide an unstable system thereby to prevent perching of poultry on said trough, each of said reel members having a length less than twice the normal width of the poultry attempting to roost thereon.

15. The apparatus of claim 1 wherein each of said reel members is formed of relatively thin metal and is mounted along its axial center line on said bearing means, each of said reel members having oppositely extending flanges formed on its side edges.

References Cited in the file of this patent

UNITED STATES PATENTS

| | | | |
|---|---|---|---|
| 511,701 | Jacobs | Dec. 26, | 1893 |
| 2,517,865 | Gilmour | Aug. 8, | 1950 |
| 2,539,299 | Duhmert | Jan. 23, | 1951 |
| 2,715,887 | Flannery et al. | Aug. 23, | 1955 |
| 2,793,616 | Warner | May 8, | 1957 |
| 2,825,303 | Ashby | Mar. 4, | 1958 |
| 2,843,087 | Gray | July 15, | 1958 |
| 3,006,321 | Bailey | Oct. 31, | 1961 |
| 3,034,481 | Godshalk | May 15, | 1962 |
| 3,052,215 | Shold | Sept. 4, | 1962 |